No. 12,362. REISSUED JUNE 20, 1905.

A. B. BELLOWS.

SWITCH STAND.

APPLICATION FILED NOV. 2, 1904.

2 SHEETS—SHEET 1.

WITNESSES:
Herbert Bradley.
Fred Kuchner

Arthur B. Bellows INVENTOR
by Christy and Christy,
Attys.

PHOTO-LITHOGRAPHED BY SACKETT & WILHELMS LITHO. & PTG. CO. NEW YORK.

No. 12,362. REISSUED JUNE 20, 1905.

A. B. BELLOWS.

SWITCH STAND.

APPLICATION FILED NOV. 2, 1904.

2 SHEETS—SHEET 2.

WITNESSES:
Herbert Bradley.
Fred Kirchner.

INVENTOR
Arthur B. Bellows
by Christy and Christy
Attys.

PHOTO-LITHOGRAPHED BY SACHETT & WILHELMS LITHO. & PTG. CO. NEW YORK.

No. 12,362. Reissued June 20, 1905.

UNITED STATES PATENT OFFICE.

ARTHUR B. BELLOWS, OF PITTSBURG, PENNSYLVANIA.

SWITCH-STAND.

SPECIFICATION forming part of Reissued Letters Patent No. 12,362, dated June 20, 1905.

Original No. 724,656, dated April 7, 1903. Application for reissue filed November 2, 1904. Serial No. 231,160.

*To all whom it may concern:*

Be it known that I, ARTHUR B. BELLOWS, a citizen of the United States, residing at Pittsburg, in the county of Allegheny and State of Pennsylvania, have invented or discovered certain new and useful Improvements in Switch-Stands, of which improvements the following is a specification.

The invention described herein relates to certain improvements in switch-stands, and has for its object a construction and combination of parts whereby the movement of the switch-rails may be effected by a movement of the operating-lever in a plane parallel or substantially parallel to the rails of the track.

The invention is hereinafter more fully described and claimed.

Figure 1:
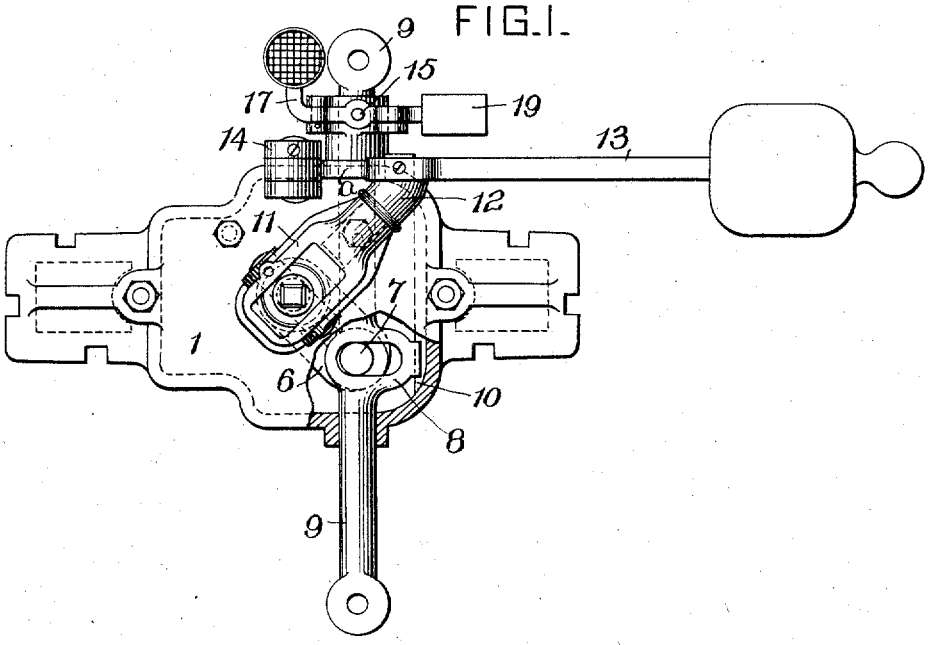
Figure 2:
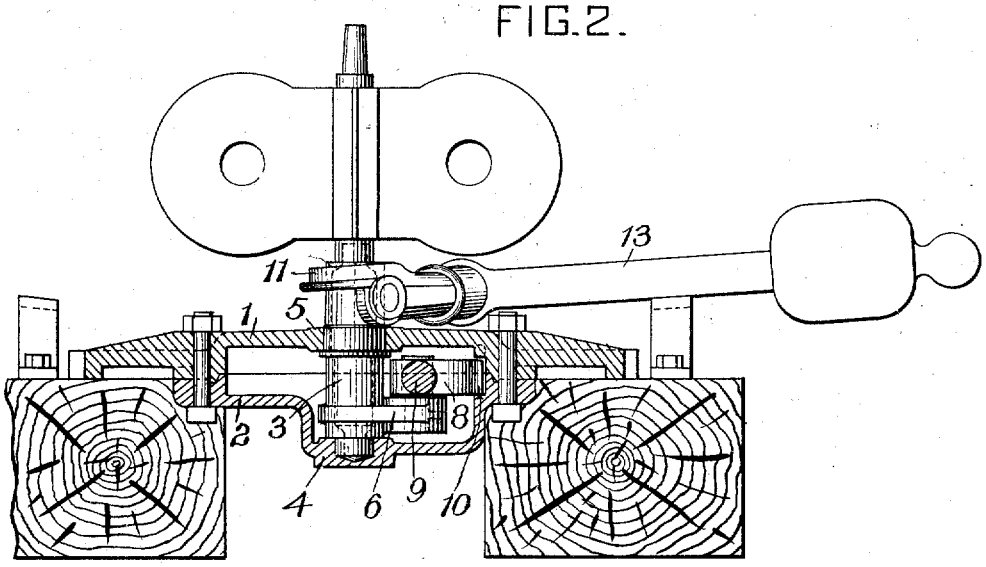
Figure 3:
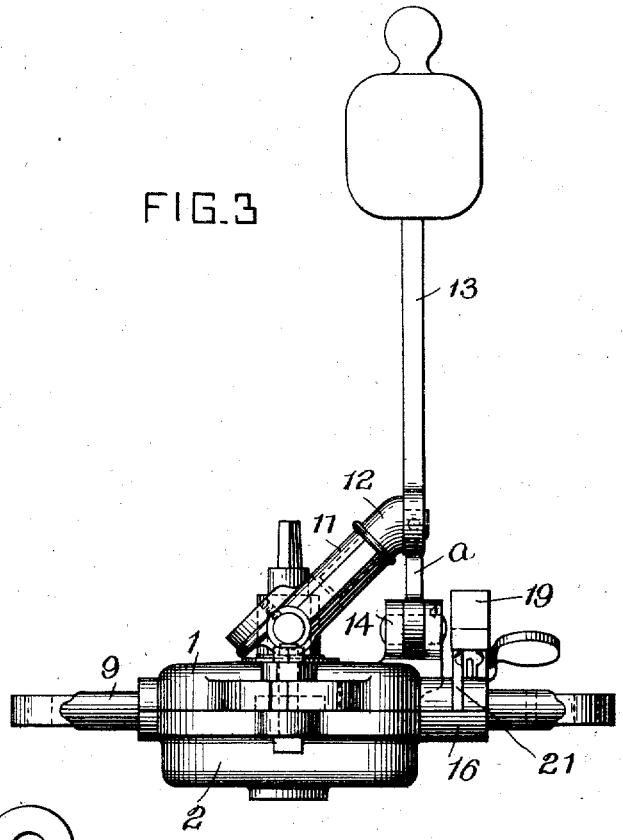
Figure 5:
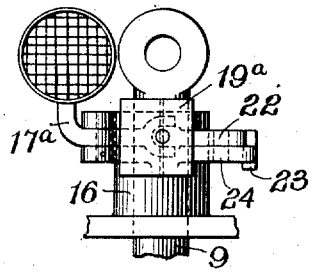
Figure 4:
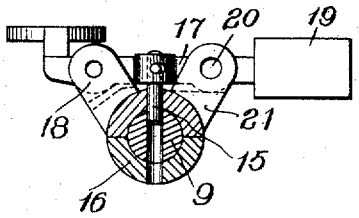
Figure 6:
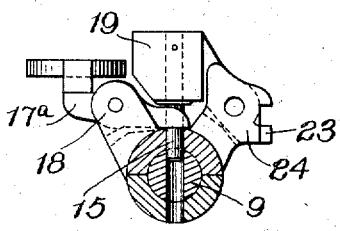

In the accompanying drawings, forming a part of this specification, Figure 1 is a top plan view of my improved switch-stand. Fig. 2 is a sectional elevation of the same on a plane indicated by the line II II, Fig. 1. Fig. 3 is a side elevation showing the operating-lever in mid-position. Fig. 4 is a sectional view of the lock mechanism on a plane indicated by the line IV IV, Fig. 3. Fig. 5 is a top plan view of a modification of the lock mechanism, and Fig. 6 is a sectional view of the same.

In the practice of my invention I employ a case or shell consisting of the upper and lower parts 1 and 2, which are adapted to be secured together by suitable bolts and to adjacent cross-ties or other foundation by spikes or other suitable means. It is preferred that the upper portion of the case or shell should overlap the lower portion, as shown in Fig. 2, and that the securing-spikes should pass through suitable notches formed in the edges of the overlapping portions of the upper portion of the case or shell. A vertical shaft 3 has its lower end journaled in suitable bearings 4, formed in the lower portion 2 of the case or shell, and said shaft projecting up through the upper portion of the case or shell has a bearing 5 formed therein. An arm 6 is formed on or secured to the vertical shaft and is provided with a pin 7, engaging a slot formed in a transverse enlargement 8 in the switch-rod 9, so that by rotation of the vertical shaft a longitudinal back-and-forth movement is imparted to the switch-rod. It is preferred in order to prevent any rotation of the switch-rod or shaft that a bearing 10 for the lateral extension of the switch-rod should be formed in the vertical side of the case or shell, as clearly shown in Fig. 2. A yoke 11, provided at its outer end with a socket, is pivotally connected to the vertical rod or shaft just above or outside of the upper portion of the case or shell, and a block 12, provided with a projection or pin adapted to enter the socket in the yoke, is secured to the operating-lever 13, which, as shown, is pivotally mounted, preferably, between lugs 14, formed on the case or shell in such manner that the plane of movement of the operating-lever will be at right angles to the switch-rod, and consequently parallel or substantially parallel with the rails of the track. As is customary in this form or style of switch-stand the operating-lever is moved through an arc of one hundred and eighty degrees and is designed when in its normal positions to lie upon or closely adjacent to the surface of the ground. When the operating-lever is shifted from one position to the opposite, the block 12 is carried through an arc whose axis will coincide with the axis of the pivot-pin of the lever and will carry with it the yoke 11, the pin-and-socket connection between the yoke and block permitting a rotation of the block relative to the yoke during this movement. This movement of the shaft-operating yoke or arm is in a curved surface coinciding with the surface of a half-cone having its apex at the intersection of the axes of the shaft 3 and the pin connecting the yoke to the shaft. The plane of movement of the yoke is determined by the part *a*, connecting the end of the yoke with a point on the axis of rotation of the lever and yoke, such point being in the axis of the pivot-pin connecting the lever to the case or shell. As in the construction shown the lever moves in a vertical plane parallel or substantially parallel with the rails of the track, the part or connection *a* is formed by the lower portion of the lever.

In order to lock the switch-rod in its different positions, a pin 15 is arranged in the lateral extension 16 of the upper portion of the case or shell and is adapted to enter transverse holes in the switch-rod in its different normal positions. In the construction shown in Figs. 3 and 4 this pin is loosely connected to a lever 17, pivotally mounted on lugs 18 and provided with a foot-plate, whereby the pin may be raised out of engagement with the switch-rod. The opposite end of the lever is provided with a weight 19 to return the lever to normal position, and when in normal position a hole 20 in the lever will be in alinement with a similar hole in the lug 21 on the case or shell, so that the hasp of a padlock or other locking device may be passed through these parts, and thereby lock the switch-rails in position. In Figs. 5 and 6 the pin 15 is connected to a block or weight $19^a$, which is adapted to be raised by the lever $17^a$, carrying the foot-piece, the lever projecting under the block. The block is provided with a laterally-projecting arm 22, having a lug 23, projecting alongside of the lug 24 on the extension of the case or shell, and the latter lug also bearing along its opposite edge against the block. The arm extending from the block is provided with an opening registering with an opening in the case or shell, so that the block and pin may be locked as against vertical movement when desired. It will be observed that the movement of the operating-lever is in a vertical plane parallel or substantially parallel with the rails of the track, so that the operator moving along the track will not have to change his direction of movement to shift the switch, but has only to stoop down and pull the lever over, and, further, while shifting the lever the operator does not have to bring any portion of his body in dangerous proximity to the track.

I claim herein as my invention—

1. A switch-stand having in combination, a case or shell, a vertical shaft having bearings in the case or shell and provided with an arm, a switch-bar longitudinally movable in bearings in the case or shell and having a sliding connection with the arm on the shaft, a lever pivotally mounted in a plane at right angles to the switch-bar and an arm pivotally connected at its ends to the shaft and lever, substantially as set forth.

2. A switch-stand having in combination, a case or shell, a vertical shaft having bearings in the case or shell and provided with an arm, a switch-bar provided with a slot for the reception of a pin on the shaft-arm, a lever movable in a single plane at right angles to the switch-bar and loose connection between the lever and shaft, substantially as set forth.

3. A switch-stand having in combination a vertical shaft provided with an arm, a switch-bar provided with a transverse slot for the reception of a pin on the shaft-arm, a lever movable in a plane at right angles to the switch-bar, a yoke pivotally connected to the shaft and a block connected to the lever and having a rotatable connection with the yoke, substantially as set forth.

4. A switch-stand having in combination a switch-operating lever, a switch-bar operating connections between the lever and switch-bar, a weighted locking-pin adapted to engage the switch-bar and lever for shifting the pin, substantially as set forth.

5. A switch-stand having in combination, a case or shell, a vertical shaft having bearings in the case or shell and provided with an arm, a switch-bar having a connection with the arm on the shaft, a lever pivotally mounted in a plane at right angles to the switch-bar and an arm pivotally connected at its ends to the shaft and lever, the connection with the lever being outside of the case or shell substantially as set forth.

6. A switch-stand having in combination, a case or shell, a vertical shaft having bearings in the case or shell and provided with an arm, a switch-bar provided with a slot for the reception of a pin on the shaft-arm, a lever movable in a single plane at right angles to the switch-bar, and connection between the lever and shaft, substantially as set forth.

7. A switch-stand having in combination a vertical shaft provided with an arm, a switch-bar connected to the shaft-arm, a lever movable in a plane at right angles to the switch-bar, a yoke pivotally connected to the shaft and a block connected to the lever and having a rotatable connection with the yoke, substantially as set forth.

8. A switch-stand having in combination, a case or shell, a vertical shaft having bearings in the case or shell, a switch-bar operatively connected to the shaft, a lever having a connection to the shaft outside of the case or shell, and having a pivotal connection to the case or shell, substantially as set forth.

9. A switch-stand having in combination a case or shell, a vertical shaft having bearings in the case or shell, a switch-bar operatively connected to the shaft, a yoke or arm, a connection from the yoke or arm to the case or shell outside of the latter for determining the plane of movement of the yoke and means for shifting the yoke or arm, substantially as set forth.

10. A switch-stand having in combination a case or shell a vertical shaft having a bearing in the case or shell, a switch-bar operatively connected to the shaft, an arm or yoke pivotally connected to the shaft, and means outside of the case or shell and movable with the arm or yoke for determining the plane of movement of the latter, substantially as set forth.

11. A switch-stand having in combination a case or shell, a vertical shaft journaled therein, a switch-bar operatively connected to the shaft, a yoke or shaft operating arm pivotally connected to the shaft, and a movable connection between the arm and case or shell and outside of the latter for determining the plane of movement of the arm, substantially as set forth.

In testimony whereof I have hereunto set my hand.

ARTHUR B. BELLOWS.

Witnesses:
ALICE A. TRILL,
DARWIN S. WOLCOTT.